Figure 1:
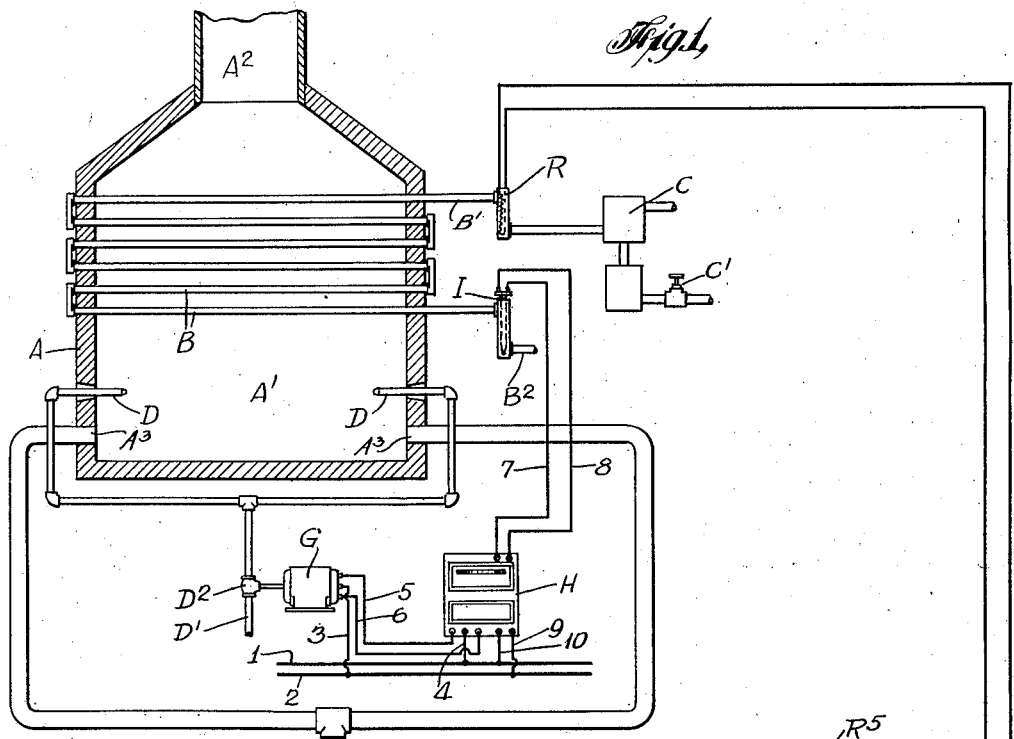

Jan. 31, 1933.   R. P. BROWN   1,895,701
OIL HEATER CONTROL
Filed June 11, 1926

INVENTOR
RICHARD P. BROWN
BY John E. Hubbell
ATTORNEY

Patented Jan. 31, 1933

1,895,701

UNITED STATES PATENT OFFICE

RICHARD P. BROWN, OF PHILADELPHIA, PENNSYLVANIA, ASSIGNOR TO THE BROWN INSTRUMENT COMPANY, OF PHILADELPHIA, PENNSYLVANIA, A CORPORATION OF PENNSYLVANIA

OIL HEATER CONTROL

Application filed June 11, 1926. Serial No. 115,183.

The general object of the present invention is to provide an improved method of and improved apparatus for regulating the ratio of heat supplied to heat required in an oil refining tube still or heater in such manner as to heat the oil passing through the heater tubes to an approximately constant exit temperature. More specifically, the object of the invention is to make the regulation of the ratio of heat supplied to heat required dependent not only on the exit oil temperature but also in part upon some condition of heater operation which tends to produce, or to preindicate a subsequent change in the exit oil temperature. By proceeding in this manner I am enabled to effect compensating adjustments in time to prevent or minimize changes in exit oil temperature which would otherwise occur.

Assume, for example, an oil heater which has been operating for some time with a constant rate of heat supply, in heating oil supplied to the heater at a constant rate of feed and at a constant temperature. During the said period of steady operation if the proper ratio of heat supplied to heat required has been maintained, the exit oil temperature will be that desired. If following such a period of steady operation, the temperature at which the oil to be heated passes to the heater changes, the heat requirements of the heater will also be changed, and unless the rate at which heat is supplied is correspondingly changed, the temperature at which the oil leaves the heater will be changed, though the change in the exit oil temperature will lag behind the change in the temperature at which oil passes to the heater as a result of the fact that in a tubular oil heater some period of time varying in heaters of different type from a few seconds to three-quarters of an hour or so, is required for any particle or molecule of oil to pass through the heater, and also because of the heat storage capacity of the heater. By suitably utilizing the temperature of the oil passing to the heater as a regulating factor, it is possible to effect adjustments in the rate of heat supply which will compensate wholly or largely for the tendency of a change in the inlet oil temperature to effect a change in the exit oil temperature without actually resulting in much or any change in the exit oil temperature. By thus making the control of the ratio of heat supplied to heat required dependent not only on the temperature to which the oil is heated, but on a change in the inlet oil temperature, or in some other factor tending to produce a change in the exit oil temperature, the rate at which heat is supplied to the heater may be varied more gradually as a result of a given change in inlet oil temperature or other change tending to change the exit oil temperature, than would be required if the control were made wholly dependent on the temperature to which the oil is heated, and the tendency of the control system to produce hunting is thereby eliminated or greatly minimized.

The control of the ratio of heat supplied to heat required may obviously be had by varying the heat supplied, or by varying the rate at which oil is passed through the heater, or by simultaneously varying both the rate of heat supply and the rate of oil feed to the heater.

In a preferred practical mode of carrying out the invention, the supply of fuel to the combustion chamber of the heater is made directly dependent on the temperature to which the oil is heated and the supply of air for combustion is made dependent on the inlet oil temperature, the supply of fuel being increased or decreased as the temperature to which the oil is heated in passing through all, or one or more portions, of the oil flow path formed by the tubes, falls below or rises above a predetermined value, and the amount of combustion supporting air being increased or decreased accordingly as the inlet oil temperature falls below or rises above some normal, average or predetermined temperature.

This method of control tends to minimize variations in the maximum combustion chamber temperature of the oil heater, since the increased demand for heat resulting from a decrease in the inlet oil temperature is compensated for by a corresponding increase in the weight of heating gases rather than by an increase in the maximum temperature of the heating gases or combustion chamber walls. Such a method of control is especially advantageous because it minimizes the risk of maximum temperatures high enough to overheat the oil or heater structure, and also because it tends to a desirably gradual change in temperature of the oil being heated since the increase in weight of heating gases may be made to increase the rate at which the oil is heated up in the initial portion of its travel through the oil heater rather than to increase the rate of heat absorption by the oil in the final portion of its travel through the oil still.

In accordance with the present invention the regulation of the supply of air in response to the inlet oil temperature may be effected by adjusting the speed regulator of a forced draft fan or some analogous draft regulator in a predetermined manner as the inlet oil temperature changes, or a more accurate control may be secured by measuring the air supplied in some manner, and adjusting the forced draft fan or other draft regular as required to maintain a definite relation between the quantity of air supplied and the inlet oil temperature. For example, thermometric means responsive to the inlet oil temperature may readily be combined with means responsive to the $CO_2$ content in the flue gases to adjust the draft as required to make the weight of the heating gases vary in a definite and predetermined manner in response to changes in the inlet oil temperature. This control is made possible by the well known fact that with complete combustion, the amount of $CO_2$ in the heating gases will vary in almost exact linear proportion with the ratio of fuel burnt to air supplied for its combustion.

The various features of novelty which characterize my invention are pointed out with particularity in the claims annexed to and forming a part of this specification. For a better understanding of the invention, however, and the advantages possessed by it, reference should be had to the accompanying drawing and descriptive matter in which I have illustrated and described preferred embodiments of the invention.

Figure 2:
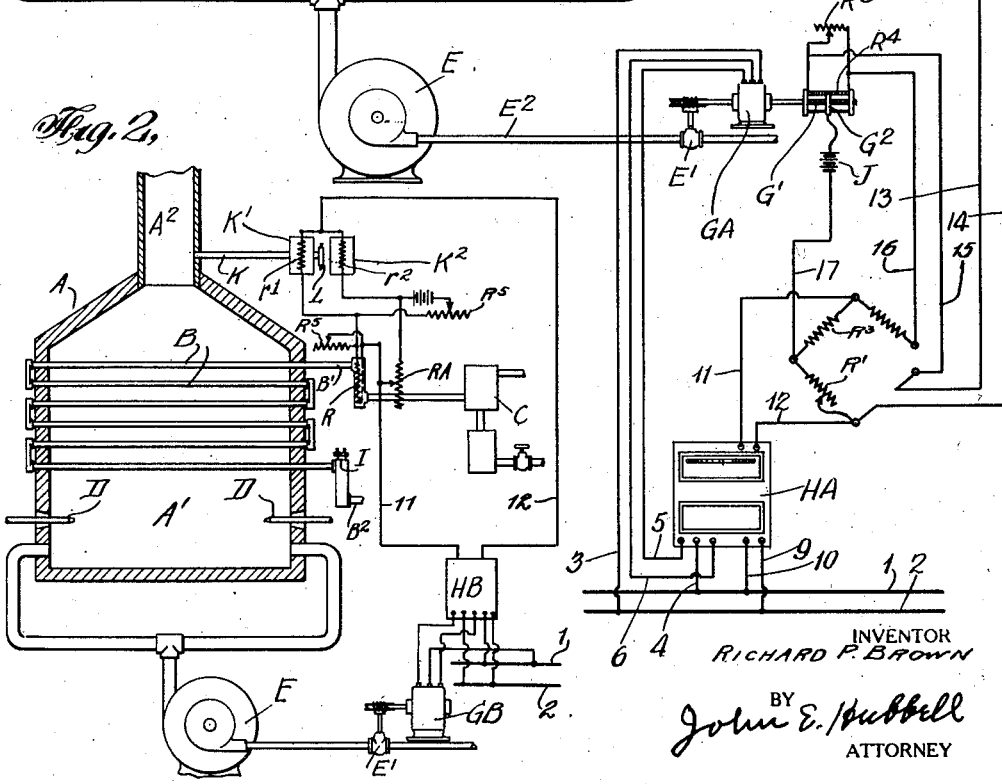

Of the drawing:

Fig. 1 is a diagrammatic representation of an oil refining tube still and regulating devices; and Fig. 2 is a view taken similarly to Fig. 1 illustrating a modified arrangement.

In Fig. 1 I have diagrammatically illustrated an embodiment of the present invention, including a tube still A of conventional type. As shown, the tube still comprises a combustion chamber A' beneath a bank of horizontal tubes B, which are swept by the heating gases passing from the combustion chamber A' to the furnace stack outlet A². The tubes B are connected at their ends so that the oil passes successively through tubes B at successively lower levels from an oil inlet B' to an oil outlet B². The oil to be refined is supplied to the inlet B' by a fuel pump C at a rate dependent on the speed of operation of the latter. The speed of the pump C may be varied as by the manually or automatically controlled throttle valve C' in the steam line of the pump, to vary the rate of oil feed as conditions may make desirable. Fluid fuel, which ordinarily is oil, is supplied to the combustion chamber A' through burner nozzles D. The burner nozzles D receive fuel from a suitable pressure source (not shown) through a supply pipe D' at a rate depending on the adjustment of a fuel supply regulating valve D². As shown in Fig. 1, the nozzles D extend though but do not fill openings in the combustion chamber walls, and in consequence the fuel jets discharged by the nozzles tend to draw into the combustion chamber atmospheric air at a rate proportional to the rate at which fuel is being supplied. Additional air for combustion is supplied to the combustion chamber through the air inlets A³ at a rate which in the arrangement shown in Fig. 1 depends on the speed of a turbine driven blower E and is controlled by the adjustment of a valve E' in the steam supply pipe E².

The fuel supply regulating valve D² is adjusted by means of a reversible motor G controlled by a pyrometer controller H as required to increase and decrease the rate of fuel supply to the combustion chamber A' on a decrease or increase of the oil temperature at some point or points in its path of flow through the heater. To this end, I employ in Fig. 1, a thermo-couple I responsive to the exit oil temperature and connected in circuit with the controller H, by conductors 7 and 8. As shown, one terminal of the motor G is connected by a conductor 3 to the conductor 2 of an electric current supply or power circuit. The controller H operates in response to the potential developed by the thermo-couple I to connect one terminal 5 of the motor G to the conductor 1 of the power circuit through a conductor 4 and thereby cause the motor G to rotate in a direction to close the valve D² when the potential of the thermo-couple I exceeds a predetermined value. Conversely, when the potential of the thermo-couple I falls below the predetermined value, the controller H connects a second terminal 6 of the motor G to the conductor 4, and thereby causes the motor G to rotate in the direction to increase the flow through the valve D².

The controller H may be of any usual or suitable form of instrument for the purpose. In general, it includes a volt meter having its terminals connected to the conductors 7 and 8, and includes a switch mechanism controlled by the volt meter pointer and serving to connect the conductor 4 to the motor terminal 5, or to the motor terminal 6, accordingly as the potential between the conductors 7 and 8 rises above or falls below a predetermined value. The switch mechanism in an instrument of this type is ordinarily operated by a motor or other relay which may be energized from the supply conductors 1 and 2 through conductors 9 and 10. I have not thought it necessary to illustrate or describe in detail the construction of the controller H, for the reason that the present invention does not depend on the specific form of the controller, and various forms of control instruments suitable for the purpose may be employed. For example, the controller H may be of the type disclosed in my prior Patent No. 1,355,448, granted October 12, 1920.

With a constant rate of oil feed, the amount of heat required to maintain a constant oil temperature at the oil exit of the oil heater will obviously increase and decrease as the inlet oil temperature diminishes and increases. In Fig. 1 the effect of inlet oil temperature variations is compensated for by varying the blower speed to decrease and increase the air supplied to the combustion chamber A' accordingly as the inlet oil temperature rises above or falls below a normal value.

The means provided for this purpose comprises a reversible motor GA for adjusting the valve E', which is connected to electric supply conductors 1 and 2, and to a controller HA as the motor G is connected to the supply conductors and controller H. The controller HA which may be identical with the cntroller H, has its volt meter connected to opposed points of, and energized by a Wheatstone bridge, of which two connected arms are formed by resistances R' and R³ respectively. A third arm of the bridge includes a conductor 16, and the portion of a resistance R⁴ at the right of an adjustable contact G² engaging the resistance R⁴ intermediate its ends; while the fourth arm of the bridge includes a thermometer resistance R responsive to the inlet oil temperature, the portion of the resistance R⁴ at the left of the contact G², and conductors 13, 14 and 15. The bridge is energized by a source of current J, included in a circuit branch 17 connecting the contact G² to the bridge junction at which the resistances R' and R³ are connected to each other. The contact G² is formed with a threaded passage receiving a threaded portion G' of the spindle of the motor GA, so that the contact is moved longitudinally of the resistance R⁴ to the right or to the left, when the motor GA adjusts the valve E' in the opening or closing direction, respectively. The position of the contact G², and the relative portions of the resistance R⁴ in the third and fourth arms of the Wheatstone bridge thus vary in a predetermined manner with the setting of the valve E'.

The mechanism described makes the setting of the valve E', and thereby the rate at which air supplied to the combustion chamber A', vary in a predetermined manner with the inlet oil temperature. To attain this result the controller HA is so connected to the Wheatstone bridge, and the latter is so arranged that when the inlet oil temperature rises and the resistance value of the thermometer resistance R is thereby increased, the controller HA connects the conductor 4 to the terminal 5 of the motor GA, and the latter then rotates in the direction required to close the valve E', until the bridge balance is restored by the resultant decrease in the portion of the resistance R⁴ in the fourth arm of the bridge, and the corresponding increase in the portion of the resistance R⁴ in the third arm of the bridge. Conversely, when the inlet oil temperature falls, the valve is subjected to a corresponding opening movement and the contact G² is shifted to the right a corresponding amount. An adjustable resistance shunt R⁵ about the resistance R⁴ makes it possible to vary the extent of adjustment of the valve E' produced by a given change in inlet oil temperature.

With the apparatus shown in Fig. 1, the controller H and associated parts adjust the fuel supply to the burners D as required to maintain an approximately constant exit oil temperature, and would tend to do this if no other control provisions were employed. Without the aid of means compensating for variations in inlet oil temperature, however, the operation of the controller H would necessarily result in hunting and exit oil temperature fluctuations. The substantial time required for an oil molecule to flow through the tubes B would necessarily prevent the thermo-couple I from being influenced by a change in inlet oil temperature until some minutes after the actual heat requirement of the still had varied as a result of such change. The heat storage capacity of the still furnace also introduces a time lag element tending to produce hunting if the control is wholly dependent on the exit oil temperature.

By the conjoint use of the two controllers H and HA as shown in Fig. 1, hunting and fluctuations in the exit oil temperature may be substantially eliminated since on a change in the inlet oil temperature, the controller HA immediately begins to increase or decrease the amount of air supplied to the combustion chamber A'. The increase in the rate of air supply, occurring on a decrease in inlet oil temperature, tends to cool the combustion chamber and lower the exit oil temperature, but as soon as the exit oil temperature drops the controller H immediately begins to increase the rate of fuel supply and the exit oil temperature is thereby restored to normal. The net result is an increase in the rate of heat supply as is required to heat the colder oil coming to the still to the desired final temperature. The increased rate of heat supply does not result in any, or at least in a corresponding increase in combustion chamber temperature, but does result in an increased weight of heating gases which tends to desirably increase the relative amount of heat absorption by the tubes B remote from the chamber A'. Similarly, on an increase in entrance oil temperature and consequent decrease in the need of heat, the rate of air supply is correspondingly diminished which tends to higher combustion chamber and exit oil temperatures, neutralized immediately by the action of the controller H which immediately decreases the rate of fuel supply.

In the ordinary practical use of the apparatus shown in Fig. 1, the apparatus should be so adjusted that with the usual, or average, inlet oil temperature, the controller HA will maintain the blower E in operation at the rate required to maintain an efficient and desirable ratio between the rates at which fuel and air for its combustion are supplied to the combustion chamber. In practice this requires air to be then supplied at a rate substantially in excess of the amount actually entering into combustion. The control provisions shown in Fig. 1 increase or decrease the "excess air ratio" accordingly as the inlet oil temperature decreases below or increases above its normal or average value. A variation of the excess air ratio in either direction from its most efficient value, may tend to reduce the furnace efficiency, but, as is well known to those skilled in the art, considerable variations in the excess air ratio can occur without any very marked effect on the furnace efficiency, and such slight decreases in thermal efficiency as may occur in the apparatus of Fig. 1 on variations in the excess air ratio in either direction from its best value, are of small importance in comparison with the improved control of the oil heating operation obtained by the use of the invention.

With the counter flow of oil and heating gases obtained with the type of oil heater illustrated in Fig. 1, the effect of increasing the weight of heating gases without appreciably changing their maximum temperature, tends to a greater increase in the rate of heat absorption by the oil in the portion of its path of travel through the tubes B adjacent the oil inlet B' than in the portion adjacent the oil exit. This is in general desirable in the operation of oil heaters for heating oil to a refining temperature, since in such stills it is generally desirable to maintain the oil at temperatures approaching its exit temperature for an appreciable time interval before the oil leaves the heater.

In an ordinary tubular oil heater of the type illustrated, the velocity of oil flow is so slow relative to the length of the path of flow through the tubes B that it takes a number of minutes for any given particle of oil to pass from the oil inlet B' to the oil outlet B². Obviously a departure of the inlet oil temperature from the normal or average value which is followed by a return to the normal value in a fraction of the time required for a particle of oil to pass from the inlet B' to the outlet B², requires less compensation in the rate of heat supply than is required by the same variation in inlet oil temperature maintained for an appreciably longer time. Allowance for this fact may be made in various ways. For example, with a suitable speed reducing gear connection between the motor GA and the valve E', the time required for the adjustment of the latter may be made such that on a given variation in the inlet oil temperature the progressive adjustment of the valve E' into the position corresponding to the new inlet oil temperature will require a period of time comparable with the time required for an oil particle to pass from the inlet B' to the outlet B² of the heater.

With the apparatus shown in Fig. 1, the direct result of a change in inlet oil temperature is a corresponding adjustment of the valve E', and the actual excess air ratio maintained is affected by the characteristics of the blower, as well as by the manner in which the speed of the blower E varies in response to the adjustments of the valve E'. The actual angular movement given to the shaft of valve E' as a result of a change in inlet oil temperature may be varied by changing the gear ratio between that shaft and the shaft of the motor GA, and also by adjusting the resistance R⁵.

The same general control, however, may be made independent of such factors as blower characteristics and the manner in which the speed of the blower E varies with the changes in the adjustment of the valve E'. This result is obtained with the apparatus shown in Fig. 2 by automatically controlling the blower E in joint response to the $CO_2$ content in the heating gases leaving the furnace and to the inlet oil temperature.

In Fig. 2 the fuel supply to the burners D is regulated as in Fig. 1, and the air supplied to the combustion chamber is controlled through a motor GB operating on the turbine blower steam inlet valve E' of the turbine blower E as in Fig. 1. The motor GB is directly controlled by a controller HB which may be generally like the controller HA and may control the motor GB in the same general manner as the controller HA controls the motor GA in Fig. 1. In Fig. 2, however, the volt meter of the controller HB is connected in a control circuit which is effected in opposite directions by similar changes (either increases or decreases) in the $CO_2$ content of the flue gases and in the inlet oil temperature.

This control circuit in the form shown in Fig. 2 comprises a Wheatstone bridge to opposed points of which the terminals 11 and 12 of the galvanometer of the controller HB are connected. Two connected arms of the Wheatsone bridge include resistances $r'$ and $r^2$ respectively. A third arm of the Wheatstone bridge connected to the arm including the resistance $r'$, includes a thermometer resistance R which is responsive to the inlet oil temperature as in the construction first described. The fourth arm of the Wheatstone bridge includes a resistance RA.

The resistance $r'$ is located in the cell K' of an electric $CO_2$ analyzer of known type. The space within the cell K' surrounding the resistance $r'$, is filled with flue gas, which may be continually drawn through the cell from the stack outlet $A^2$ by means of a pipe K and a suitable aspirator L. The resistance $r^2$ which should be similar to the resistance $r'$ is located in a cell $K^2$ which is identical with the cell K' except that it is filled with air or some other standard gas which may be sealed in the cell. The resistance RA may advantageously be of a material which does not change in resistance with changes in atmospheric temperature to which it is subjected, and may have a resistance value which is equal to that of the thermometer resistance R when the latter is at its normal or average value.

In the well known type of $CO_2$ analyzer illustrated the resistance value of the resistances $r'$ and $r^2$ differ from one another only as a result of the difference in their temperatures which result from the different thermal conductivities of the flue gas in the cell K' and the air or other standard gas in the cell $K^2$. $CO_2$ is a poorer heat conductor than air and in consequence the resistance $r'$ will normally be at a higher temperature than the resistance $r^2$, and hence of higher resistance value by an amount which increases and diminishes as the $CO_2$ content in the flue gases increases and diminishes. Advantageously, to assist in calibrating the apparatus, a variable resistance $R^5$ is connected in shunt about the resistance R, and the resistance RA is made adjustable. By adjusting the resistance $R^5$ in shunt to the thermometer resistance R, the relative importance in the control system of a given change in the $CO_2$ content of the flue gas and a given change in inlet oil temperature may be varied.

Since in Fig. 2 an increase in the $CO_2$ content of the flue gases, and an increase in the inlet oil temperature each tends to increase the resistance in the arm of the Wheatstone bridge in which it is included, the galvanometer of the controller HB will respond in the same direction to an increase in the $CO_2$ content of the flue gases and to a decrease in the inlet oil temperature, and, of course, will respond in the opposite direction to a decrease in the $CO_2$ content and to an increase in the inlet oil temperature. In consequence, if the controller HB is arranged to increase or decrease the air supplied to the furnace as required to maintain a constant $CO_2$ content in the flue gas while the inlet oil temperature remains constant at its normal or average value, on an increase or decrease in the inlet oil temperature, the $CO_2$ content in the flue gases will be correspondingly increased or diminished. The excess air ratio may, therefore, be made to increase and decrease as desired when the inlet oil temperature decreases and increases.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features. The expression "condition of heater operation" as used in claims hereinafter appended is intended to include the temperature at which the oil enters the heater as one such condition of heater operation.

Having now described my invention, what I claim as new and desire to secure by Letters Patent, is:—

1. In heating oil to a refining temperature in a tube heater, the improved method of maintaining an approximately constant oil temperature at the heater outlet which comprises making a compensating adjustment in the ratio of heat supplied to heat required in automatic response to the occurrence of a change in a condition of heater operation which would be followed by a subsequent change in the exit oil temperature if no such adjustment were made.

2. In heating oil to a refining temperature in a tube heater, the improved method of maintaining an approximately constant oil temperature at the heater outlet which comprises adjusting the ratio between heat supplied to heat required in the heater in automatic response both to changes in the temperature at which the oil enters, and in the temperature to which the oil is heated in the heater.

3. The method of regulating combustion in the furnace of a tubular oil heater comprising walls defining a combustion chamber space and a path of flow for the heating gases moving away from said space, tubes extending across said path and located at different distances along said path from space connections for moving the oil to be heated progressively through said tubes in the order of their remoteness from the end of said path at which the heating gases enter the latter, which consists in effecting compensating variations in the rate of combustion in automatic response to changes in the temperature to which the oil is heated in said tubes, and in effecting compensating variations in the ratio of supply to said space of fuel and air for the combustion of said fuel in automatic response to changes in the inlet oil temperature.

4. The method of operating a tubular oil heater which consists in increasing and decreasing the rate of combustion therein in response to changes in the temperature to which the oil is heated in the heater as required to maintain said temperature approximately constant, and increasing and decreasing the excess combustion air as the inlet oil temperature decreases and increases.

5. The method of operating a tubular oil heater which consists in increasing and decreasing the rate of combustion in response to variations in the temperature to which the oil is heated as required to maintain said temperature approximately constant, and additionally increasing and decreasing the heat available for absorption by the heater as the inlet oil temperature decreases and increases.

6. The method of operating a tubular oil heater which consists in varying the excess air in joint response to the temperature at which fluid is supplied to the heater to be heated therein, and to the composition of the heating gases so as to increase and decrease the amount of excess air as said temperature decreases and increases.

7. The combination with a tubular fluid heater of means automatically responsive to the temperature to which the fluid is heated in the heater for regulating the rate of combustion in the heater, and means responsive to the temperature at which the fluid enters the heater for regulating the excess air ratio in the heater.

8. The combination with a tubular oil heater of a control system comprising fuel supply means automatically responsive to the exit oil temperature and combustion air supply means automatically responsive to the inlet oil temperature.

9. The combination with a tubular oil heater of a heat supply control system comprising means responsive to the temperature to which the oil is heated in the heater, and means responsive to a condition of heater operation, changes in which tend to produce subsequent changes in said exit oil temperature.

10. The combination with a tubular fluid heater of means responsive to the temperature at which the fluid to be heated passes to the heater and means responsive to variations in the composition of the heating gases, and mechanism jointly controlled by said means for increasing and decreasing the excess air content of said heating gases as said temperature decreases below or rises above a predetermined value.

11. The combination with a tubular fluid heater of thermo-electrical means responsive to the temperature at which the fluid to be heated passes to the heater, and electrical means responsive to variations in the composition of the heating gases, of means for increasing and decreasing the excess air ratio in said heating gases as said temperature decreases below or rises above a predetermined value including an electrical control instrument to which both of said first mentioned means are connected.

12. In heating oil to a refining temperature in a tube heater the tubes of which provide an elongated path of oil flow in which the oil is progressively heated, the improvement which consists in subjecting the heater tubes to a heating effect jointly dependent on the temperature of the oil at separated points along said path at which the temperature of the oil differs as a result of the heat absorbed by it in passing between said points.

13. The method of operating a tubular oil heater which consists in varying the relative rates of heat absorption by the oil in different longitudinal portions of the path of flow through the heater so as to minimize temperature fluctuations of the oil in said portions.

14. In the operation of a tubular oil heater, the method which comprises automatically regulating the relative rates of heat absorption in different longitudinal portions of the path of oil flow through the heater as to maintain oil temperatures of predetermined values in different portions of said path.

15. In regulating combustion in a tubular oil heater, the method step which consists in varying the rate of combustion in the heater in joint response to a change in flue gas composition and a change in the temperature at which oil to be heated is supplied to the heater.

16. In continuously heating fluid to an approximately constant temperature by transferring heat thereto from a fluid heating medium which cools as heat is transferred from it, the method which consists in passing said fluid through an elongated heating path and in passing said medium in a generally counter-flow direction along a second path in heat transfer relation with said heating path, and increasing and decreasing the amount of heat carried into said second path by said medium in accordance with decreases and increases respectively in the temperature of said fluid at a point in said heating path remote from its exit end, whereby more or less heat is available for heating the fluid in the portion of said heating path between the delivery end of the latter and said point accordingly as the temperature at said point is relatively low or high.

Signed at Philadelphia, in the county of Philadelphia, and State of Pennsylvania, this 9 day of June, A. D. 1926.

RICHARD P. BROWN.